US007310771B2

(12) United States Patent
Burago et al.

(10) Patent No.: US 7,310,771 B2
(45) Date of Patent: Dec. 18, 2007

(54) METHOD AND COMPUTER-READABLE MEDIUM FOR PROVIDING PAGE AND TABLE FORMATTING SERVICES

(75) Inventors: Andrei Burago, Kirkland, WA (US); Christoph E. Ammann, Sammamish, WA (US); Sergey Genkin, Kirkland, WA (US); Eliyezer Kohen, Mercer Island, WA (US); Victor Kozyrev, Issaquah, WA (US); Anton A. Sukhanov, Bellevue, WA (US); Igor Zverev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 394 days.

(21) Appl. No.: 11/019,015

(22) Filed: Dec. 20, 2004

(65) Prior Publication Data

US 2006/0136817 A1   Jun. 22, 2006

(51) Int. Cl.
*G06F 15/00* (2006.01)
(52) U.S. Cl. ..................................... 715/517
(58) Field of Classification Search ............... 715/517, 715/500, 530, 525
See application file for complete search history.

(56) References Cited

U.S. PATENT DOCUMENTS

| | | | | |
|---|---|---|---|---|
| 5,724,498 | A * | 3/1998 | Nussbaum | 345/471 |
| 5,937,160 | A * | 8/1999 | Davis et al. | 709/203 |
| 6,061,700 | A * | 5/2000 | Brobst et al. | 715/517 |
| 6,144,974 | A * | 11/2000 | Gartland | 715/517 |
| 6,285,460 | B1 * | 9/2001 | Koh et al. | 358/1.18 |
| 6,772,144 | B2 * | 8/2004 | Brid et al. | 707/3 |
| 6,915,482 | B2 * | 7/2005 | Jellum et al. | 715/511 |
| 7,107,525 | B2 * | 9/2006 | Purvis | 715/517 |
| 7,149,969 | B1 * | 12/2006 | Thrane | 715/523 |
| 7,213,202 | B1 * | 5/2007 | Kagle | 715/517 |
| 2001/0054049 | A1 * | 12/2001 | Maeda et al. | 707/517 |
| 2002/0042819 | A1 * | 4/2002 | Reichert et al. | 709/217 |

(Continued)

OTHER PUBLICATIONS

Golovchinsky et al., Hypertext Interaction Revisited, ACM 2000, pp. 171-179.*
Ilson, Interactive Effectivity Control: Design and Applications, ACM 1988, pp. 85-91.*
Dalal et al., Managing Distributed Collections: Evaluating Web Page Changes, Movement, and Replacement, ACM 2004, pp. 160-168.*
Francisco-Revilla et al., Perception of Content, Structure, and Presentation Changes in Web-based Hypertext, ACM 2001, pp. 205-214.*

(Continued)

*Primary Examiner*—Cong-Lac Huynh
(74) *Attorney, Agent, or Firm*—Merchant & Gould

(57) ABSTRACT

A computer-implemented method and computer-readable medium are provided for providing page and table layout services. According to the method, a layout manager program provides layout services to client application programs. The layout manager receives requests from client application programs to format document content. In response to such requests, the layout manager performs one or more callback operations to the client application to retrieve portions of the document to be laid out. Once the portions of the page to be laid out have been retrieved through the callback operations, the layout manager lays out the portions of the document and notifies the client application that the layout is completed. The client application can then query the layout manager for the formatting result.

18 Claims, 7 Drawing Sheets

U.S. PATENT DOCUMENTS

| | | | |
|---|---|---|---|
| 2002/0184632 A1* | 12/2002 | Reitmeier | 725/47 |
| 2002/0186241 A1* | 12/2002 | Kohda et al. | 345/744 |
| 2003/0051022 A1* | 3/2003 | Sogabe et al. | 709/223 |
| 2003/0056177 A1* | 3/2003 | Nara et al. | 715/525 |
| 2003/0221170 A1* | 11/2003 | Yagi | 715/517 |
| 2004/0030719 A1* | 2/2004 | Wei | 707/104.1 |
| 2004/0066530 A1* | 4/2004 | Wu et al. | 358/1.15 |
| 2004/0117479 A1* | 6/2004 | Jellum et al. | 709/224 |
| 2004/0177327 A1* | 9/2004 | Kieffer | 715/901 |
| 2004/0230889 A1* | 11/2004 | Ishiyama et al. | 715/501.1 |
| 2004/0230900 A1* | 11/2004 | Relyea et al. | 715/513 |
| 2005/0055634 A1* | 3/2005 | Burns et al. | 715/517 |
| 2005/0055635 A1* | 3/2005 | Bargeron et al. | 715/525 |
| 2005/0091585 A1* | 4/2005 | Parikh et al. | 715/517 |
| 2005/0195221 A1* | 9/2005 | Berger et al. | 345/660 |
| 2005/0240865 A1* | 10/2005 | Atkins et al. | 715/517 |
| 2005/0251740 A1* | 11/2005 | Shur et al. | 715/517 |
| 2005/0251742 A1* | 11/2005 | Mogilevsky et al. | 715/521 |
| 2006/0031760 A1* | 2/2006 | Jacobs | 715/517 |
| 2006/0111971 A1* | 5/2006 | Salesin et al. | 705/14 |
| 2006/0129921 A1* | 6/2006 | Relyea et al. | 715/524 |
| 2007/0180367 A1* | 8/2007 | Chiang | 715/523 |

OTHER PUBLICATIONS

Gillan et al., Navigation of HTML Tables, Frames, and XML Fragments, ACM 2002, pp. 25-32.*
Song et al., Learning Important Models for Web Page Blocks based on Layout and Content Analysis, ACM Dec. 2004, pp. 14-23.*

* cited by examiner

METHOD AND COMPUTER-READABLE MEDIUM FOR PROVIDING PAGE AND TABLE FORMATTING SERVICES

BACKGROUND OF THE INVENTION

Many different types of application programs deal with the problem of determining the appropriate layout for rich content contained on a page of a document. For instance, word processing application programs must lay out content on a finite page that potentially includes text, graphics, headers, footers, footnotes, endnotes, tables, and other types of content. Other types of application programs such as World Wide Web ("Web") browsers deal with similar problems in the context of "bottomless" document pages that do not necessarily have a fixed bottom margin.

Because application programs typically implement their own program code for performing page layout, a number of problems can arise. In particular, the code that is developed for these applications is often operating system or application dependent, thereby making reuse of the code very difficult. Moreover, because layout code is typically implemented separately by each application program, different application programs can lay out similar content in dissimilar ways. Inconsistent results as a consequence of different page layout routines in different application programs can be frustrating to a user.

Application page layout code is also often developed for utilization with only one natural language and extension to other natural languages is very difficult. Moreover, this code is often developed with one particular document file format in mind. The extension of the program code to other file formats can be very difficult. In a similar vein, it can also be very difficult to extend the page layout code provided by an application program to other types of page objects other than those initially supported by the application.

Most page layout code also works only with page geometries that have been predefined. For instance, in most application programs it is necessary for the end user to specifically define the geometry of the page by drawing boxes on the page. As an example, a user may be required to draw a box for the page header, a box first column, a box for footnotes, etc. The application program then fills the boxes with content. The user may then look at the result and adjust the geometry of the boxes. While laying content out in predefined geometries is much easier for the application program, it makes the layout process much more difficult for the user.

Another challenge to page layout code is the ability to lay out pages of a document and to provide information necessary to layout each of the resulting pages independently at a later time. This is important because a small edit to one page of a document cannot require the entire document to be re-laid out. Another feature that is lacking in page layout routines is the ability to efficiently update bottomless pages. Even when only a small portion of a bottomless page is modified, previous algorithms update the entire page. Because bottomless pages have a potentially infinite bottom margin, updating the layout of a bottomless page can be very time consuming. Long update times can be very frustrating for a computer user.

It is with respect to these considerations and others that the various embodiments of the present invention have been made.

BRIEF SUMMARY OF THE INVENTION

In accordance with the present invention, the above and other problems are solved by a method and computer-readable medium for providing page and table layout services. According to embodiments of the invention, an application-independent, operating system-independent, and reusable layout manager program is provided that provides layout services to application programs. Through the use of the layout manager, virtually any type of rich document content can be laid out as a sequence of finite pages or a bottomless page, including content utilizing any foreign language and corresponding writing direction. Because the same layout manager program may be utilized by any number of application programs, similar formatting results are provided by different application programs. Moreover, mechanisms are provided for each application to customize the formatting result.

According to one embodiment of the invention, a computer-implemented method and computer-readable medium are provided for providing page and table layout services. According to the method, a layout manager program is provided that provides layout services to client application programs, such as word processing application programs. The services provided by the layout manager are for laying out page headers and footers, figures (also referred to herein as absolutely positioned objects), floating objects, balanced columns, pagenotes and endnotes, tables, and text formatted according to different writing direction geometries. Rather than requiring a user to specify the geometry for a page, the layout manager receives requirements for the page from the client application. The layout manager then lays out the page in a manner consistent with the requirements by calculating the geometrical dimensions of the various page objects necessary to satisfy the requirements. The layout manager then returns the generated layout to the client application.

According to an embodiment of the invention, the layout manager receives a request from a client application program to format document content. The request includes formatting requirements for the document content. For instance, the client application may specify that it needs the resulting layout to include a page header containing certain text. The layout manager is responsible for calculating the size of the header. As another example, the client application may specify that certain content should be laid out in a multiple column format. The layout manager is then responsible for determining the actual height of the columns into which the content is laid out.

In response to the request from the client application, the layout manager performs one or more callback operations to the client application to retrieve portions of the content to be laid out. Once the portions of the document to be laid out have been retrieved through the callback operations, the layout manager calculates which parts of the content fits on a current page, arranges those parts on the page, and returns to the client application program a break record that allows portions of the document to be laid out on the next page. The client application program then transmits to the layout manager one or more requests for the formatting result. The layout manager then responds to the request from the client application with the result and the client application updates a display tree to reflect the page layout.

According to one embodiment of the invention, the layout manager is operative to define and impose on the client application a particular logical document structure. The logical document structure is different than the native document structure utilized by a client application to store a document on a backing store. The document structure is general enough so that a client application can easily translate from its native structure to the logical structure. When the layout manager utilizes the callback operations to retrieve the portions of the document to be laid out, the client application responds with portions of the document that are formatted according to the defined logical document structure. Because the layout manager imposes the document structure on all of its clients, the layout manager is freed from having to understand the different data structures that may be utilized by different application programs to store documents on their backing stores. In an embodiment, the document structure defined by the layout manager is different than the native document structure utilized by a client application to store a document on a backing store.

According to another embodiment of the invention, the layout manager can lay out the portions of the page provided by a client application in any possible writing direction geometry. A writing direction geometry defines a direction for the addition of new words to a page and also the direction for the addition of new lines to a page. In this manner, the layout manager is operative to lay out text in virtually any written language. The client application specifies which of the possible writing direction geometries to be utilized for a given page.

According to another embodiment of the invention, an extensibility feature is provided whereby a client application can define and lay out the contents of a client application program defined paragraph. When the layout manager encounters a client defined paragraph, it executes a client-provided method to lay out the contents of the paragraph. The client application then provides an indication to the layout manager of the formatting that was performed by the client-provided method. In this manner, a client application is free to define custom paragraph types by providing code to lay out the custom paragraphs.

According to another embodiment, the layout manager provides a process for incrementally updating the layout of a bottomless page. In particular, a client application may request that the layout manager update the layout of a bottomless page, such as in response to an edit being made to the page. As a part of the request, the client application may provide the location of the change to the layout manager. In response to the request, the layout manager is operative to locate the line that includes the location that was changed within the bottomless page. Once the changed line has been located, the layout manager reformats the changed line. The layout manager also determines if the next line was modified as a result of the reformatting. If the next line was changed, the layout manager reformats each subsequent line until no further changes are detected and the geometry after the line is the same as it was prior to the change. The layout manager then returns only the changed portion of the bottomless page to the client application. In this manner, a new layout may be generated only for the changed portion of a bottomless page, thereby reducing the amount of time necessary to lay out the page as compared to generating a completely new layout in response to an edit.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
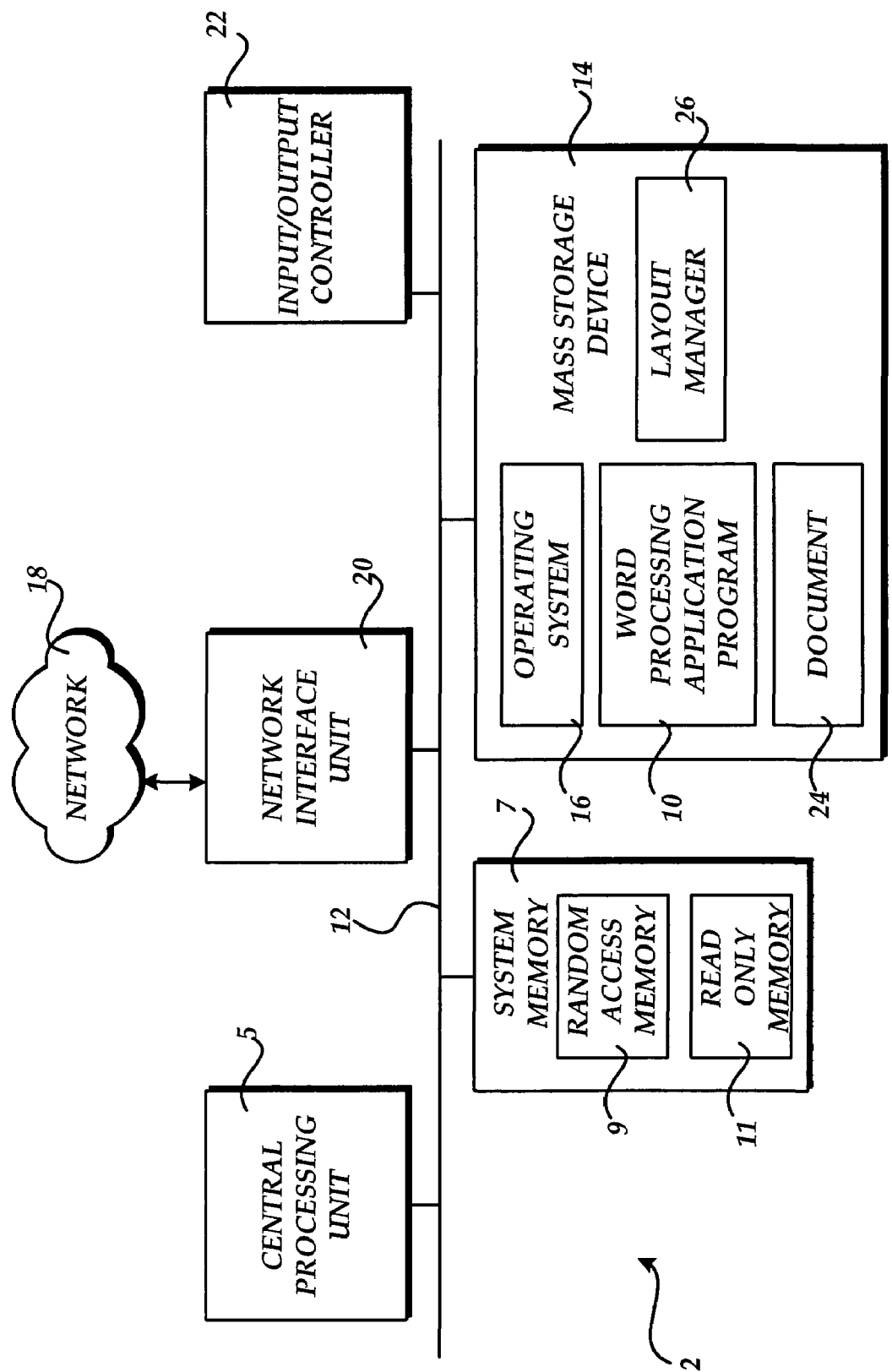
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 10. As known to those skilled in the art, the word processing application program 10 is operative to provide functionality for creating and editing electronic documents, such as the document 24.

According to one embodiment of the invention, the word processing application program 10 comprises the MICROSOFT WORD word processing application program from MICROSOFT CORPORATION. It should be appreciated, however, that other word processing application programs from other manufacturers may be utilized to embody the various aspects of the present invention. It should also be appreciated that other types of application programs that perform document layout functions may be utilized with the aspects of the present invention. For instance, the embodiments of the present invention may be utilized with desktop publishing programs, presentation programs, web browsers, and any other type of program that lays out text and other information in a document.

In conjunction with the editing of a word processing document, the word processing application program 10 provides functionality for laying out paragraphs of text and other types of objects in a document 24. The word processing application program 10 may communicate with a layout manager 26 to assist in the formatting of the document 24, including the lay out of text paragraphs and other objects. As will be described in greater detail below, the layout manager 26 provides layout services to the word processing application program 10, and to any other program executing on the computer 2. In particular, the layout manager 26 performs various algorithms to lay out text and other objects in a document. Additional details regarding the operation of the layout manager 26 will be provided below with respect to FIGS. 2-7.

Figure 2:
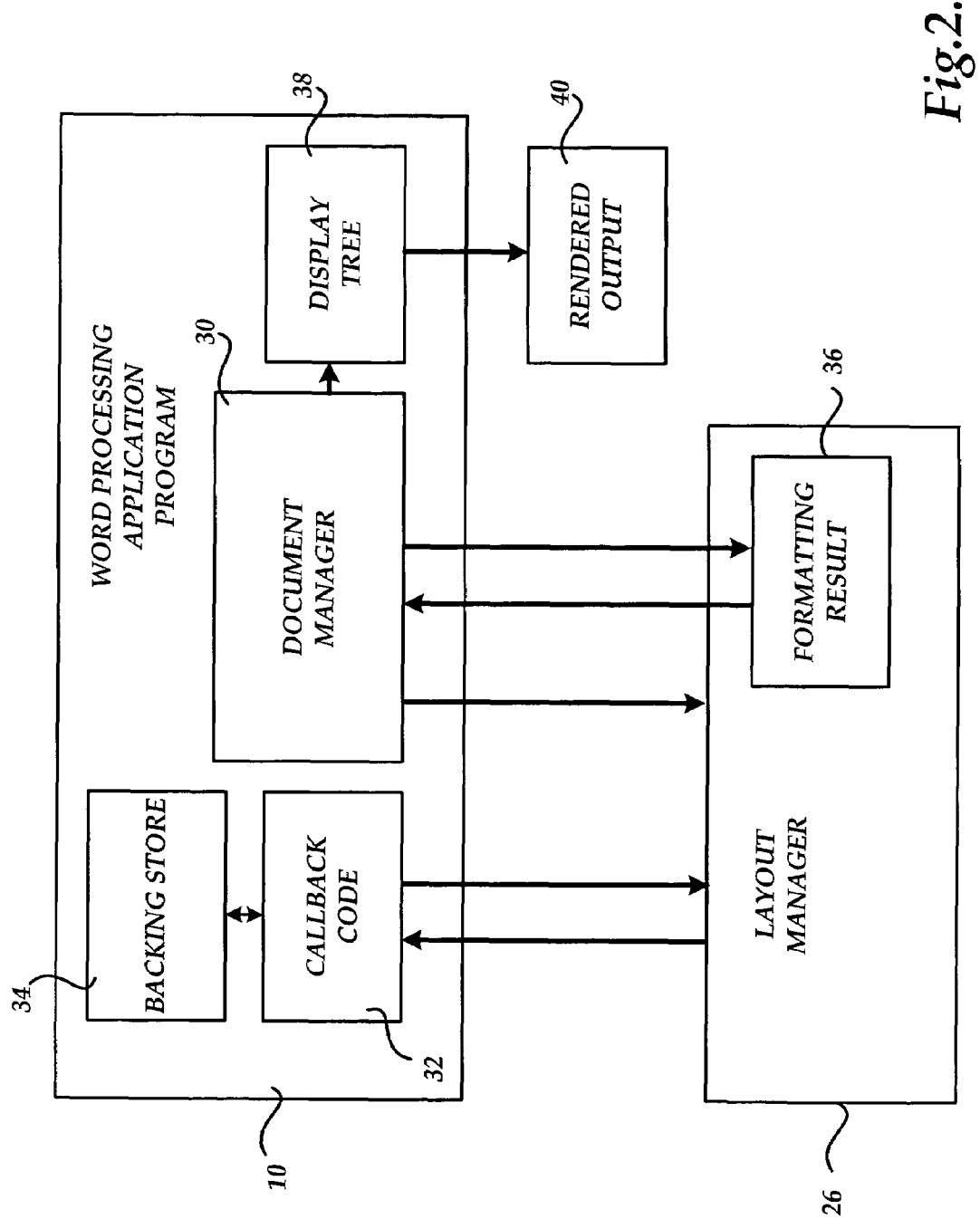
FIG. 2 is a software architecture diagram that illustrates aspects of several software components utilized in the embodiments of the invention.

Turning now to FIG. 2, additional details will be provided regarding the interaction between a client application, such as the word processing application program 10, and the layout manager 26. As described briefly above, the layout manager 26 provides document layout services to the application 10. In particular, the application 10 may communicate with the layout manager 26 to request the layout of portions of a document 24 stored in a backing store 34. In order to facilitate communication with the layout manager 26, the application 10 may implement one or more callback routines, illustrated in FIG. 2 as callback code 32. Through the use of the callback code 32, the layout manager 26 may query the application program 10 for the information necessary to lay out various portions of the document.

As will be described in greater detail below, the layout manager 26 provides facilities for laying out paragraphs of text and other objects on a page. The layout manager 26 provides these facilities in response to a request from the application program 10 to generate a page layout. The document manager 30 of the application program 10 may communicate with the layout manager 26 to request that a page be laid out. The document manager 30 may also provide to the layout manager 26 the text and other content from the document that should be laid into the paragraph. The document manager 30 may initially provide some of the content to the layout manager 26. The layout manager 26 may then request additional content from the callback code 32 as needed to lay out the page. The document manager 30 may also indicate to the layout manager 26 the style of the text or other object to be laid out. For instance, the document manager 30 may indicate the typestyle, size, and other information necessary to lay out a text paragraph to the layout manager 26.

Once the layout manager 26 has laid out a page in the manner described herein, a formatting result 36 is passed back to the document manager 30. In response to receiving the formatting result 36, the document manager 30 is operative to update the display tree 38 maintained by the application program 10. Based on the changes to the display tree 38, the application program 10 may update its rendered output 40 to display the formatting result to a user. Additional details regarding the operation of the application 10 and the layout manager 26 are provided below with respect to FIGS. 3-7.

Figure 3:
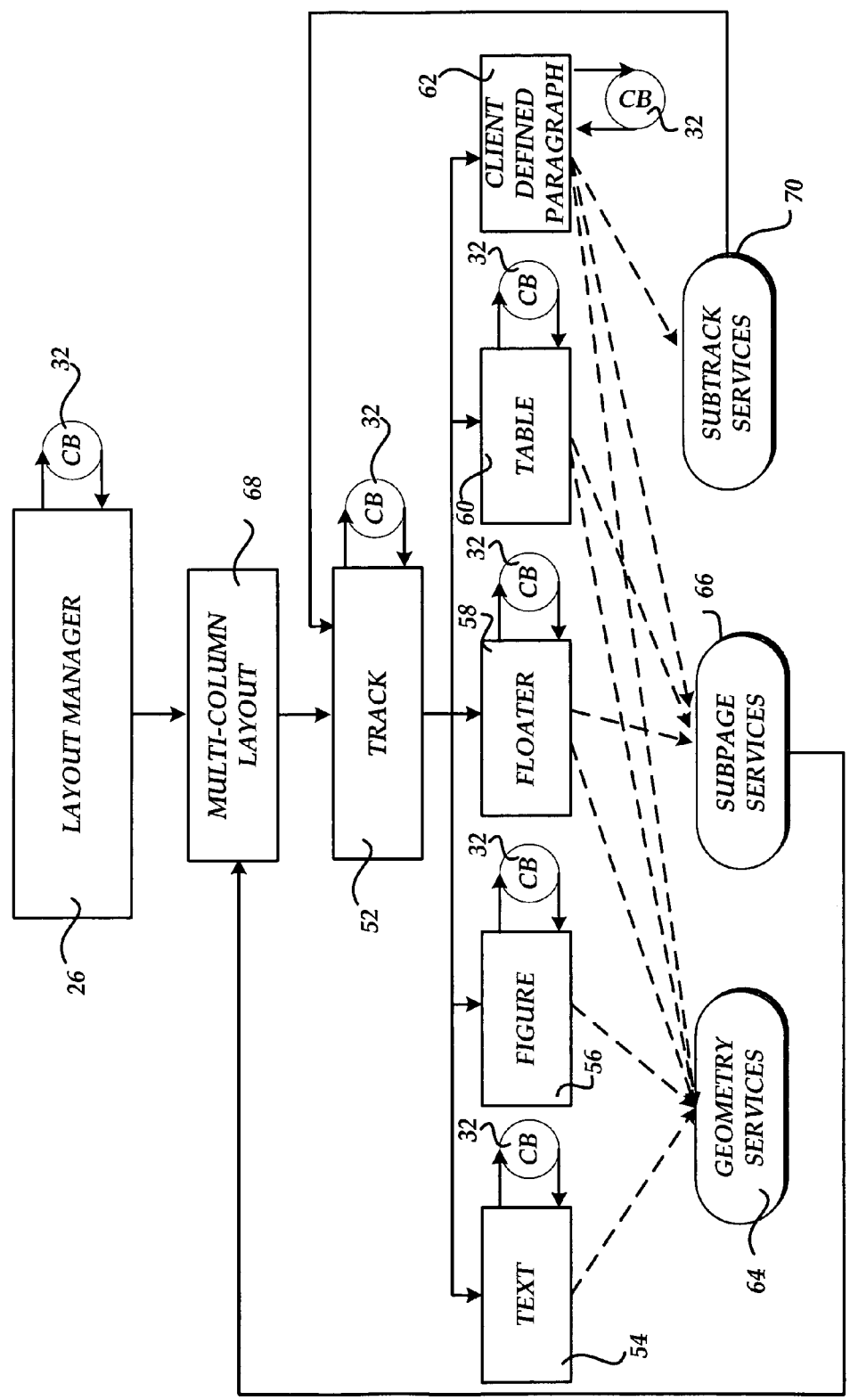
FIG. 3 is a block diagram that illustrates a number of program modules utilized by a layout manager in one embodiment of the invention.

Referring now to FIG. 3, additional details will be provided regarding the various software components utilized by the layout manager 26. As shown in FIG. 3, the layout manager 26 calls a track module 52. After the track module 52 receives control, it calls the client application through a callback to request the next paragraph and its type. As discussed briefly above, the callbacks 32 are the mechanisms by which the various software components obtain detailed information regarding the composition, location, and attributes of the various paragraph types from the client application.

When the track module 52 receives content from the client application, it dispatches it to an appropriate paragraph formatter. A text module 54, a figure module 56, a floater module 58, a table module 60, and a client defined paragraph module 62 are the paragraph formatters provided according to an embodiment of the invention. Other paragraph formatters may also be provided. Each of the paragraph formatters may then utilize callbacks 32 to request additional attributes and content from the client application. This information may be utilized by the paragraph formatters to determine whether the content fits on the page or should be broken, the size and location of the content. This information is then returned to the track module 52.

Three types of services are also made available to client applications in the various embodiments of the invention: geometry services 64, subpage services 66, subtrack services 70, and multi-column layout services 68. These services may be utilized by clients using client-defined paragraphs or by paragraph level objects utilized provided by the layout manager 26. Geometry services 64 maintains and provides information regarding the current state of the geometry of a page. Subpage services 66 allows clients to create subpages that share most of the features of a page but that have their own page geometry independent of the surrounding page geometry. Subpages can also be multi-column and contain column span areas. Subpages can be used to format the contents of table cells, floaters (e.g. text boxes), and client-defined paragraphs.

Subtrack services 70 may be used from within an implementation of a client-defined paragraph when the client application desires that the content of the paragraph should flow in the same geometry as the surrounding text. This allows text within a client-defined paragraph to flow around obstacles not present in the object itself, different content to flow around the same obstacles, and allows obstacles anchored inside the subtrack to influence the flow of text outside the subtrack. Multi-column layout services 68 provide functions for laying out text and other objects in multiple columns. Subtrack services 70 and subpage services 66 introduce recursion by calling into the track module 52.

It should be appreciated that as a result of the various integrated software components described above with respect to FIG. 3, the layout manager 26 provided herein is operative to lay out any document content, including page headers and footers, figures (also referred to herein as absolutely positioned objects), floating objects, balanced columns, pagenotes and endnotes, tables, and text formatted according to different writing direction geometries. The layout manager 26 can perform these layout functions even where the geometry of each of these types of items influences one another.

Figure 4:
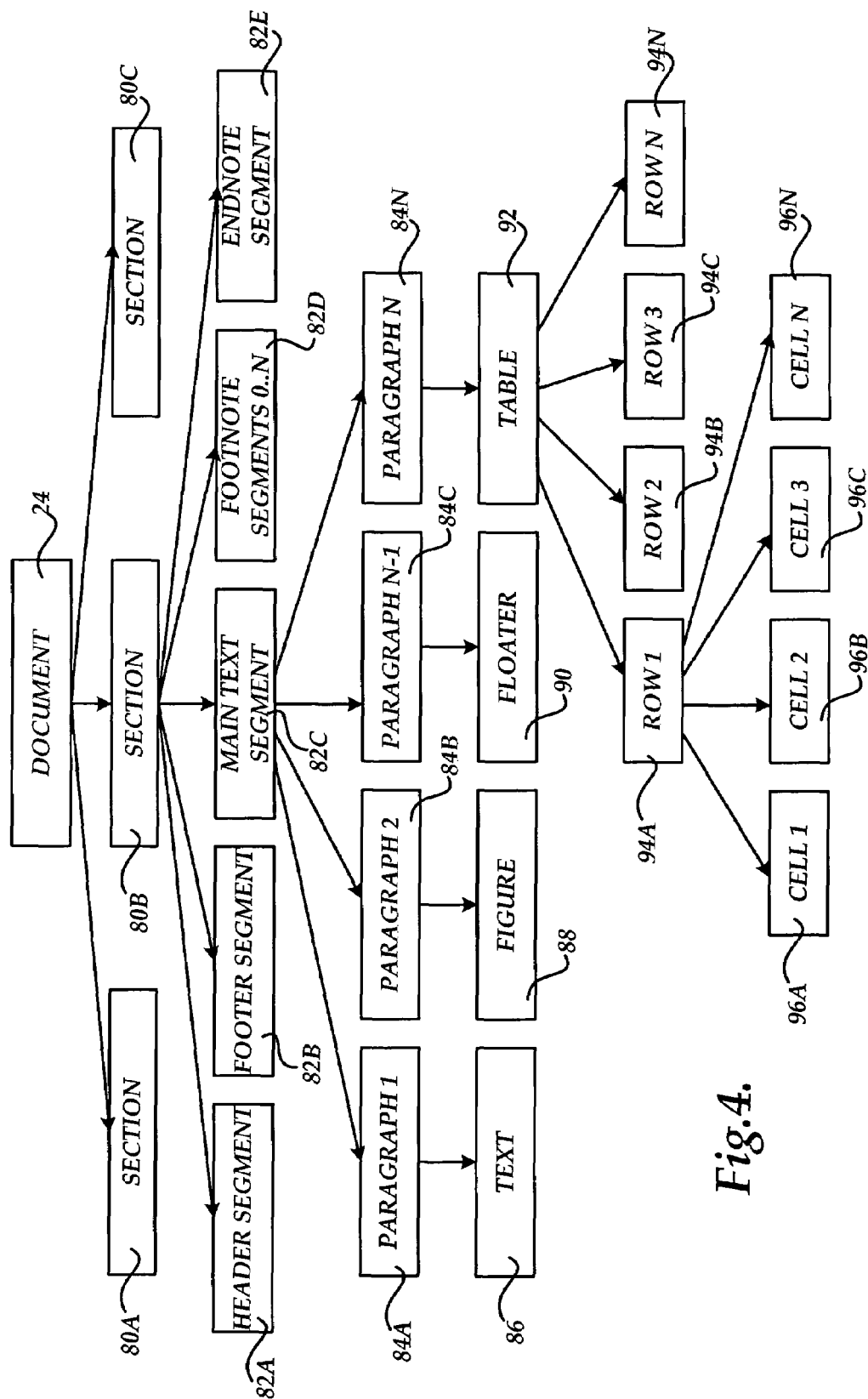
FIG. 4 is a block diagram showing a document structure imposed on client applications by a layout manager in one embodiment of the invention.

Turning now to FIG. 4, additional details will be provided regarding a defined document structure imposed on client applications by the layout manager 26. In particular, the tree hierarchy shown in FIG. 4 is utilized to show the document structure imposed on client applications by the layout manager 26. The document structure is utilized by client applications when responding to callbacks from the layout manager 26. This may involve, for instance, converting from a native data structure utilized to store the document 24 on the backing store 34.

The document structure shown in FIG. 4 includes one or more sections 80A-80C that include one or more segments 82A-82E. The term segment is an abstraction for the variety of elements that may be found in a section including headers, footers, main text, footnotes, and endnotes. These are represented by the segments 82A, 82B, 82C, 82D, and 82E, respectively. In the main text segment 82C, a number of paragraphs 84A-84N may be found. As used herein, the term paragraph not only refers to text paragraphs, but is also a generic term for any type of content that can be formatted. For instance, as shown in FIG. 4, a paragraph may comprise text 86, a FIG. 88, a floater 90, or a table 92. A table 92 may include any number of rows 94A-94N and any number of cells 96A-96N within each row.

Figure 5:
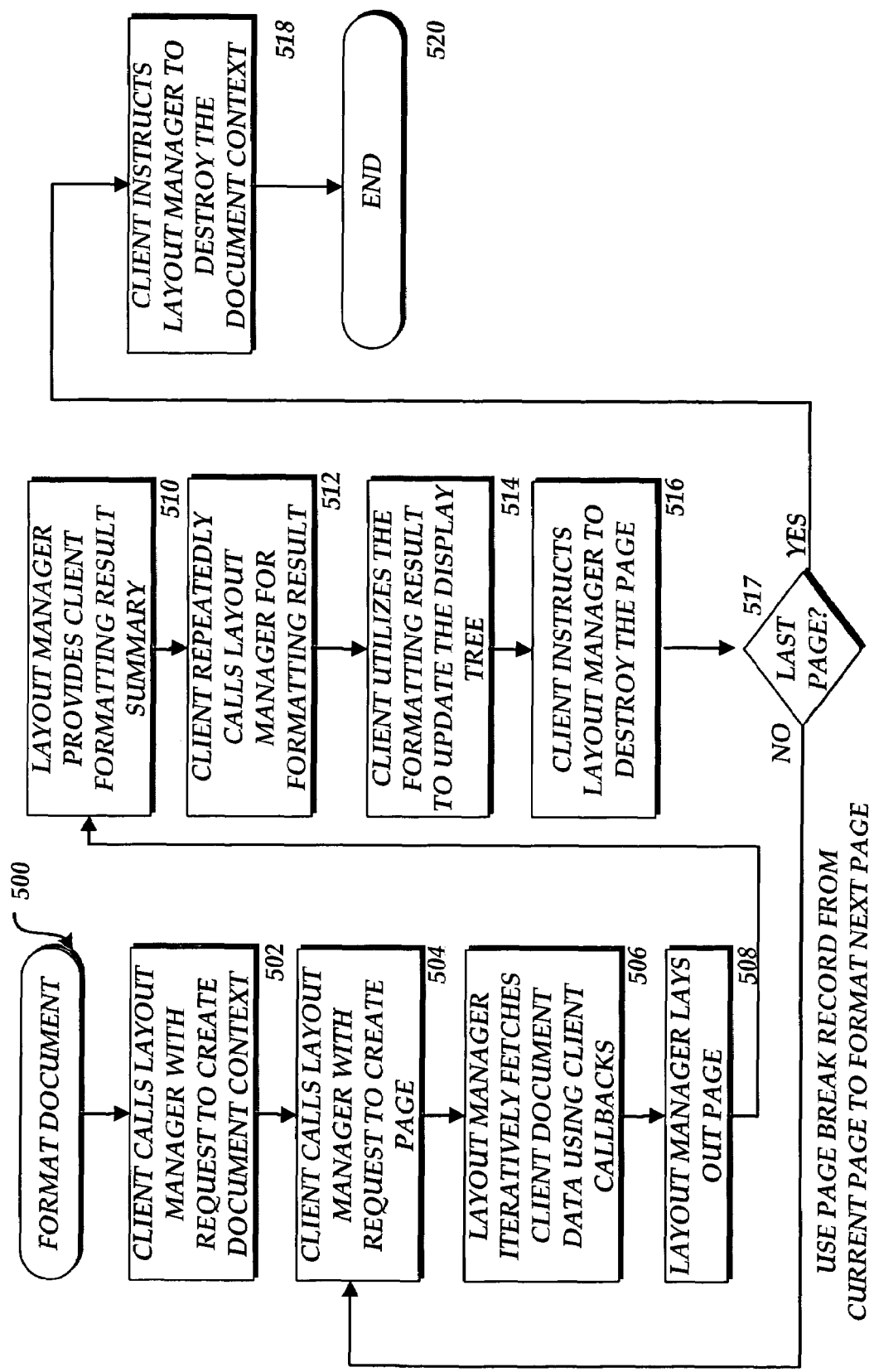
FIG. 5 is a flow diagram illustrating an exemplary routine for formatting a document page in one embodiment of the invention.

Referring now to FIG. 5, an illustrative routine 500 will be described illustrating a process performed by the layout manager 26 for laying out the content on a page of a document. It should be appreciated that although the embodiments of the invention described herein are presented in the context of a layout manager 26 and a word processing application program 10, the invention may be utilized in other types of application programs that lay out text and other types of documents on a page. For instance, the embodiments of the invention described herein may be utilized within a spreadsheet application program, a presentation application program, or a drawing or computer-aided design application program.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3, 5, and 7 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 500 begins at operation 502, where a client application program calls the layout manager 26 with a request to create a new document context for a page layout. The routine 500 then continues to operation 504, where the client application program calls the layout manager 26 with a request to create a new page within the newly created document context. From operation 504, the routine 500 continues to operation 506.

At operation 506, the layout manager 26 iteratively fetches the content and other client document data necessary to lay out the page utilizing the callbacks 32. When responding to the callbacks, the client application program converts its native data structures into the document structure defined by the layout manager and described above with respect to FIG. 4. As the layout manager 26 receives the various portions of the page to be laid out, the layout manager 26 lays out the contents of the page at operation 508.

When the layout manager 26 has completed the page layout, the layout manager 26 indicates to the client application program that the layout has been completed and provides a formatting summary to the client at operation 510. The routine 500 then continues to operation 512, where the client application program repeatedly calls the layout manager 26 to retrieve the formatting result 36. At operation 514, the client application utilizes the formatting result 36 to update the display tree 38 and the rendered output 40. The routine 500 then continues to operation 516, where the client application instructs the layout manager 26 to destroy the page.

From operation 516, the routine 500 continues to operation 517, where a determination is made as to whether the current page is the last page. If the current page is not the last page, the routine 500 returns to operation 504, where the page break record from the current page is utilized to format the next page in a manner similar to that described above with respect to operations 504-516. The page break record indicates to the client application where the layout ended for the current page. By using the page break record, the client application can determine where in the backing store formatting of the next page should begin. In this manner, the page break record for any page can be utilized to lay out the next consecutive page. This may be useful, for example, to re-lay out a page in the middle of a document without reformatting other previous or subsequent pages. If the current page is the last page, the routine 500 continues to operation 518, where the client application instructs the layout manager 26 to destroy the created document context. The routine 500 then continues from operation 518 to operation 520, where it ends.

Figure 6:
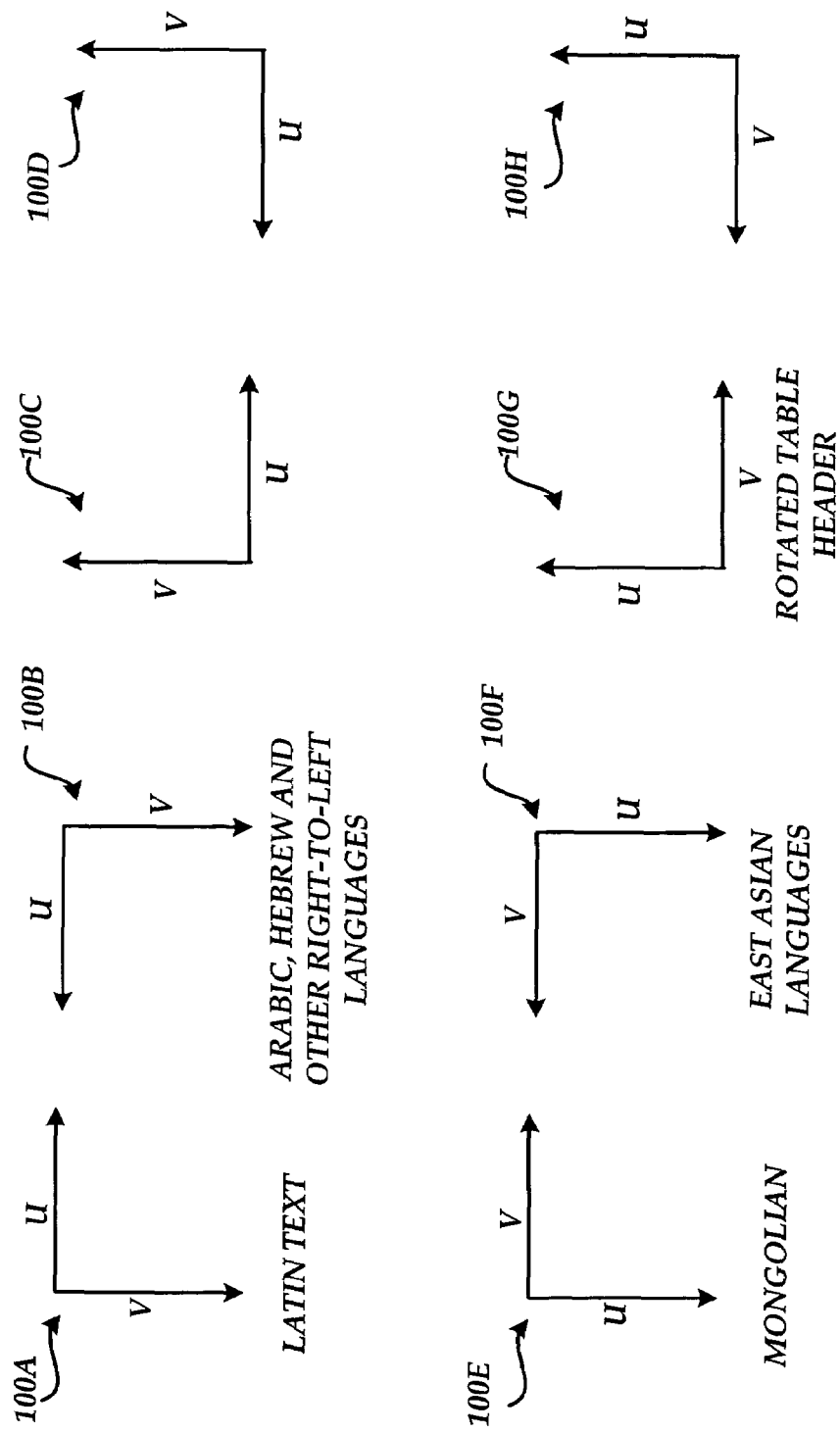
FIG. 6 is a block diagram illustrating various writing direction coordinate systems that may be utilized by a layout manager in one embodiment of the invention.

Referring now to FIG. 6, details will be provided regarding various writing direction geometries supported by the layout manager 26. In particular, FIG. 6 shows four possible writing coordinate systems 100A-100H. Each of the coordinate systems 100A-100H defines the direction in which new text and lines are added to a page of a document. The "U" axis shown in each of the coordinate systems 100A-100H refers to the direction in which new text is added to a page (character flow). The "V" axis shown in each of the coordinate systems 100A-100H refers to the direction that succeeding lines are added (paragraph flow).

The four coordinate systems 100A, 100B, 100E, and 100F represent the writing geometries utilized by most languages. For instance, the English language utilizes the coordinate system 100A. It should be appreciated, however, that other coordinate systems may be utilized and supported by the layout manager 26. In this manner, the layout manager is operative to lay out text in any written language. The client application specifies which of the possible writing direction geometries to be utilized for a given page. Additionally, it is possible for different geometries to be utilized within different paragraphs on the same page.

Figure 7:
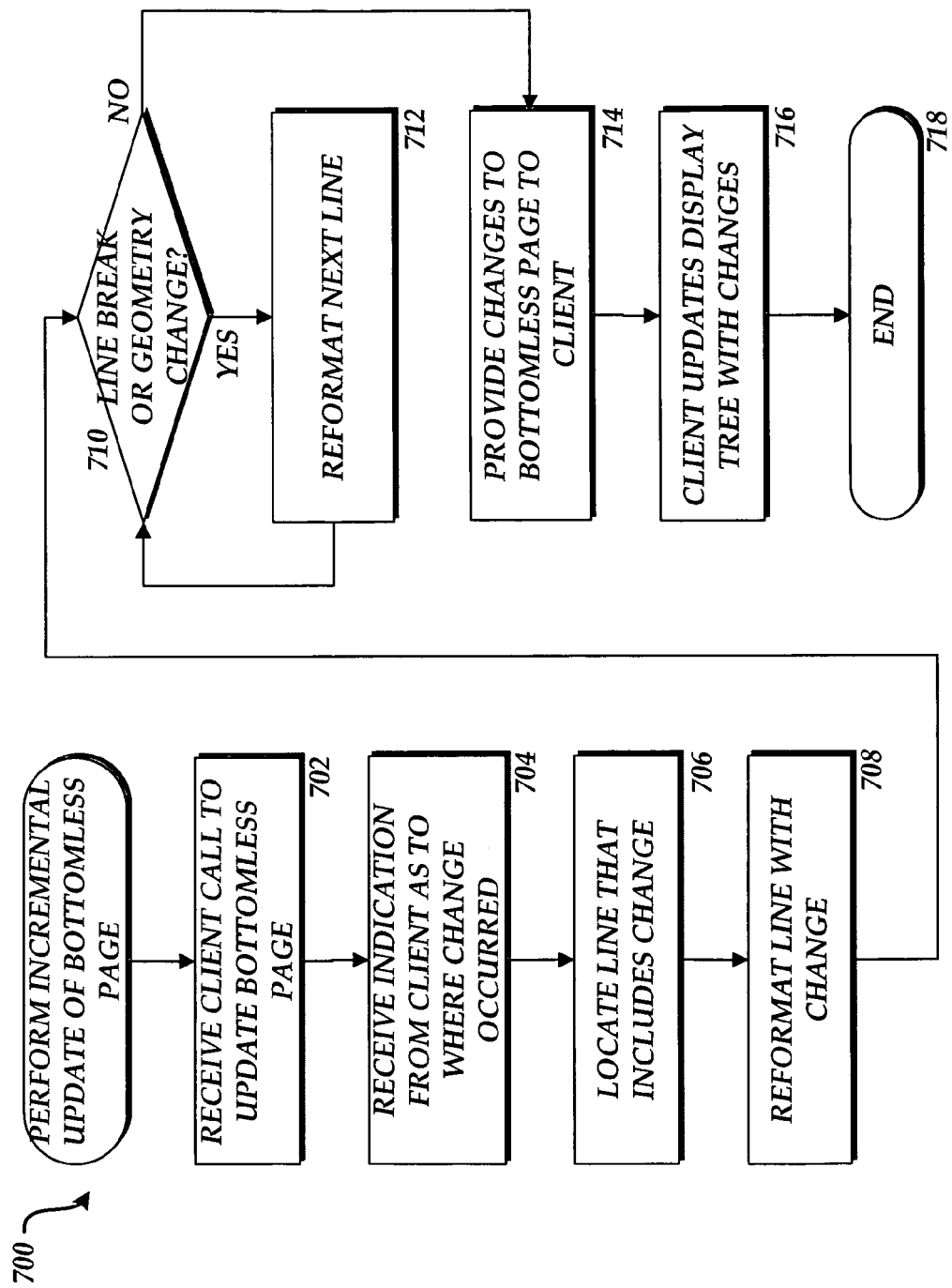
FIG. 7 is a flow diagram illustrating a routine for performing an incremental update on a bottomless document page according to one embodiment of the invention.

Referring now to FIG. 7, an illustrative routine 700 will be described for performing an incremental update to the layout of a bottomless document page. The routine 700 may be executed by the layout manager in response to a change being made to a page. The routine 700 begins at operation 702, where a client application calls the layout manager 26 to reformat a bottomless page. As discussed herein, a bottomless page is a page that does not have a fixed bottom margin and therefore has a potentially infinite length. An example of a bottomless page is a Web page that can continue indefinitely in the vertical direction.

At operation 704, the layout manager 26 receives from the client application an indication as to where on the page a change occurred. The routine 700 then continues to operation 706, where the layout manager 26 locates within the page the line at which the change occurred. The routine 700 then continues to operation 708, where the layout manager reformats only the line on which the change occurred. The routine 700 then continues to operation 710.

At operation 710, the layout manager 26 determines whether the reformatting of the line on which the change occurred resulted in a change to the line break for the line. If a changed line break did occur, the routine continues to operation 712, where the next line following the line in which the change occurred is also reformatted. The routine 700 then returns to operation 710, where a determination is made as to whether the reformatting of the next line caused a new line break. This process continues until the reformatting of a line does not result in a new line break. When this occurs, the routine 700 branches from operation 710 to operation 714.

At operation 714, the layout manager 26 provides only the changes to the page that were made as a result of the reformatting to the client application. At operation 716, the client updates the display tree 38 with the changes. The routine 700 then continues to operation 718, where it ends.

According to another embodiment, the routine 700 may be performed when a simple bottomless page is present. When a complex page is present, the layout manager 26 may reformat the entire page and do a comparison between the previous page and the newly reformatted page to identify any differences. The layout manager 26 may then identify to the client application only the differences between the two pages.

Based on the foregoing, it should be appreciated that the various embodiments of the invention include a method, system, apparatus, and computer-readable medium for providing page and table layout services. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for providing page and table layout services to a client application program, the method comprising:
receiving a request from the client application program to format a page of a document, wherein the page comprises a bottomless page;
in response to the request, performing one or more callback operations to the client application program to retrieve the request specifying one or more layout requirements and the portions of the document to be laid out, wherein performing the one or more callback operations comprises retrieving the one or more layout requirements and portions of the document to be laid out from at least one of a plurality of paragraph formatters;
laying out the portions of the document retrieved from the client application through the callback operations in a manner consistent with the layout requirements;
receiving a request from the client application program to perform an update of the layout of the bottomless page, the request including the identification of a location on the bottomless page that has been changed; and
in response to the request, locating a line within the bottomless page that includes the location that has been changed, reformatting the located line, determining whether a next line has changed as the result of the reformatting, and in response to determining that a next line has changed, reformatting a next line until the next line does not change as a result of the reformatting, and returning only the changes resulting from the reformatting of the bottomless page to the client application.

2. The computer-implemented method of claim 1, further comprising:
producing a page break record upon completing the laying out of the portions of the document;
receiving the page break record along with a request to format a second page of the document; and
utilizing the page break record to lay out only the second page of the document.

3. The computer-implemented method of claim 1, further comprising:
upon completing laying out the portions of the page, notifying the client application that the page has been laid out; and
receiving and responding to one or more requests from the client application for a formatting result that includes the laid out portions of the page, wherein the client application is further operative to utilize the formatting result to update a display tree.

4. The computer-implemented method of claim 1, further comprising:
defining a document structure for use in communicating with the client application; and
wherein the client application is operative to respond to the callback operations to retrieve portions of the page to be laid out with portions of the page that correspond to the defined document structure, wherein the document structure comprises one or more of a main-text segment, a header segment, a footer segment, a footnote, an endnote, an absolutely positioned object, a floater, or a table.

5. The computer-implemented method of claim 4, wherein the defined document structure is different than a document structure utilized by the client application to store the document on a backing store.

6. The method of claim 1, wherein laying out the portions of the page retrieved from the client application through the callback operations comprises laying out portions of the page utilizing one of a plurality of writing direction geometries.

7. The method of claim 6, wherein the writing direction geometry defines a direction for the addition of new words to the page and another direction for the addition of new lines to the page.

8. The method of claim 1, further comprising:
determining whether one of the portions of the page to be laid out comprises a client application program defined paragraph; and
in response to determining that a portion comprises a client application program defined paragraph, laying out the client application program defined paragraph by executing a client application program provided method for laying out the paragraph.

9. The method of claim 8, further comprising receiving from the client application an indication of the formatting that was performed by the client application program provided method.

10. A computer-readable medium having computer-executable instructions stored thereon which, when executed by a computer, cause the computer to:
provide a layout manager program operative to receive a request from a client application program to format a portion of a document, to perform one or more callback operations to the client application program to retrieve portions of the document to be laid out in response to the request and layout requirements, wherein performing the one or more callback operations comprises retrieving one or more layout requirements and the portions of the document to be laid out from at least one of a plurality of paragraph formatters, and to lay out the portions of the document retrieved from the client application through the callback operations in a manner consistent with the layout requirements, the layout manager being further operative to:
receive a request from the client application program to perform an update of the layout of a bottomless page, the request including the identification of a location on the bottomless page that has been changed; and
in response to the request, locate a line within the bottomless page that includes the location that has been changed, to reformat the located line, to determine whether a next line has changed as the result of the reformatting, and in response to determining that a next line has changed, to reformat a next line until the next line does not change as a result of the reformatting, and to return only the changes resulting from the reformatting of the bottomless page to the client application program.

11. The computer-readable medium of claim 10, comprising further computer-executable instructions which, when executed by the computer, further cause the layout manager to notify the client application that the document has been laid out upon completing the lay out of the portions of the document, and to receive and respond to one or more requests from the client application for a formatting result that includes the laid out portions of the document.

12. The computer-readable medium of claim 10, wherein the client application is further operative to utilize the formatting result to update a display tree.

13. The computer-readable medium of claim 12, comprising further computer-executable instructions which, when executed by the computer, further cause the layout manager to define a document structure for use in communicating with the client application, and to receive from the client application portions of the document to be laid out that correspond to the defined document structure in response to the callback operations.

14. The computer-readable medium of claim 13, wherein the defined document structure is different than a document structure utilized by the client application to store the document on a backing store.

15. The computer-readable medium of claim 14, wherein laying out the portions of the page retrieved from the client application through the callback operations comprises laying out portions of the page utilizing one of a plurality of writing direction geometries, the writing direction geometry to be utilized identified by the client application.

16. The computer-readable medium of claim 15, wherein the writing direction geometry defines a direction for the addition of new words to the page and another direction for the addition of new lines to the page.

17. The computer-readable medium of claim 16, comprising further computer-executable instructions which, when executed by the computer, further cause the layout manager to determine whether one of the portions of the page to be laid out comprises a client application program defined paragraph, and in response to determining that a portion comprises a client application program defined paragraph, to lay out the client application program defined paragraph by executing a client application program provided method for laying out the paragraph.

18. The computer-readable medium of claim 16, comprising further computer-executable instructions which, when executed by the computer, further cause the layout manager to receive from the client application an indication of the formatting that was performed by the client application program provided method.

* * * * *